Sept. 12, 1961 D. L. FREEBAIRN ET AL 2,999,391

SELF-COMPENSATING GYRO APPARATUS

Filed Dec. 11, 1950 8 Sheets-Sheet 1

INVENTORS
DARWIN L. FREEBAIRN
JOHN M. SLATER

BY William R. Lane

ATTORNEY

INVENTORS
DARWIN L. FREEBAIRN
JOHN M. SLATER
BY William R. Lane
ATTORNEY

INVENTORS
DARWIN L. FREEBAIRN
JOHN M. SLATER
BY
William R. Lane
ATTORNEY

Sept. 12, 1961 D. L. FREEBAIRN ET AL 2,999,391

SELF-COMPENSATING GYRO APPARATUS

Filed Dec. 11, 1950 8 Sheets-Sheet 4

*INVENTORS*
DARWIN L. FREEBAIRN
*BY* JOHN M. SLATER
William R. Lane
ATTORNEY

Sept. 12, 1961 D. L. FREEBAIRN ET AL 2,999,391

SELF-COMPENSATING GYRO APPARATUS

Filed Dec. 11, 1950 8 Sheets-Sheet 5

INVENTORS
DARWIN L. FREEBAIRN
JOHN M. SLATER

BY *William R. Lane*

ATTORNEY

Sept. 12, 1961 D. L. FREEBAIRN ET AL 2,999,391

SELF-COMPENSATING GYRO APPARATUS

Filed Dec. 11, 1950 8 Sheets-Sheet 6

INVENTORS
DARWIN L. FREEBAIRN
JOHN M. SLATER

BY William R. Lane

ATTORNEY

INVENTORS
DARWIN L. FREEBAIRN
JOHN M. SLATER
BY
William R. Lane
ATTORNEY

Sept. 12, 1961 D. L. FREEBAIRN ET AL 2,999,391

SELF-COMPENSATING GYRO APPARATUS

Filed Dec. 11, 1950 8 Sheets-Sheet 8

INVENTORS
DARWIN L. FREEBAIRN
JOHN M. SLATER

BY

William R. Lane

ATTORNEY

United States Patent Office 2,999,391 Patented Sept. 12, 1961

2,999,391

SELF-COMPENSATING GYRO APPARATUS

Darwin L. Freebairn, Glendale, and John M. Slater, Inglewood, Calif., assignors to North American Aviation, Inc.

Filed Dec. 11, 1950, Ser. No. 200,234
40 Claims. (Cl. 74—5.37)

This invention relates to gyroscopic apparatus of the type intended to define a stabilized reference about one, two, or three axes in space.

All gyroscopes, even after every effort has been made to eliminate torque about the output axis, experience unpredictable error torques or disturbing torques whose tendency is to cause the incorrect stabilization of the apparatus stabilized by the gyroscope. These torques may be caused by a changing mass unbalance about the precession axis (output axis) bearing of the gyroscope, by imperfections in the bearing, by convection currents, by air torques, by lead-in wire torques, by friction about the precession axis, and other causes. Experience has shown that these unpredictable error torques have large variations occurring over periods of time greater than a few minutes.

The principal object of this invention is provision of gyroscopically stabilized reference apparatus wherein gyroscope drift errors due to disturbing torque (which exists in any gyroscope) are caused very largely to cancel out or be compensated in a manner to minimize the net stabilization error in the apparatus stabilized by gyroscopes.

Another object of this invention is the provision of gyroscopically stabilized apparatus wherein the gyroscopes are caused to present a periodically reversing angular momentum vector to such source of disturbing torque as may exist, whereby the over-all effect of the torque is to cause periodic reversal of drift sense and, hence, minimum net error.

Another object of this invention is to provide a gyroscope in which the disturbing torque is substantially independent in magnitude of the direction of spin of the rotor thereof.

Another object of this invention is to provide, in combination, a reference frame, a plurality of gyroscopes having disturbing torque characteristics largely independent of spin direction, and means for periodically reversing the direction of rotation of said gyroscopes.

It is another object of this invention to provide an inertial gyroscopically stabilized platform employing self-compensation of gyroscope drift errors.

A further object is to provide gyroscopic apparatus in which the individual gyro disturbing torques are measured by self-contained means independent of such reference as gravity, the earth's magnetic field, and star-sights; and compensating torques are automatically applied.

Gyroscopically stabilized apparatus is employed in a number of ways, for various purposes, in navigation. In all cases, the purpose is to define one or more axes in space which preserve a fixed or a predeterminately changing relation to inertial space while being as independent as possible of movements of the base. Such apparatus is based on the property of gyroscopes represented by the equation $$M(\text{torque}) = WH(\text{product of precession velocity and angular momentum})$$

In conventional gyroscopes, effort is made to keep the disturbing torque M as small as possible, while H is maintained large (by use of a heavy rotor, high speed, etc.) so that the precession or drift rate W is minimized. The accuracy (freedom from drift) attainable in such apparatus is dependent largely upon the degree to which disturbing torque M can be reduced. Various expedients are in use for minimizing M, such as use of air-lubricated bearings or liquid flotation for supporting the gyroscope, in order to avoid coulomb friction torque; use of specially rigid rotor and rotor bearing constructions to avoid torque due to mass shift; and use of extreme care in balancing and other adjustments. However, the demand for higher and higher gyroscope accuracy has made it more and more difficult to achieve the required accuracy by any mere refinements of design, construction, and adjustment.

The present invention is based on new principles involving self-compensation of errors, which do not presuppose perfect gyros for perfect performance. The principles are these: (1) While it is physically impossible to provide a gyroscope which is perfectly free from disturbing torque, it is possible to provide one in which the disturbing torque is largely independent of sense of spin of the rotor; (2) By periodically reversing the spin direction, and hence the direction of the H vector, the disturbing torque can be caused to produce equal and opposite drift of the gyroscope, with a small or zero net drift over an extended period of time.

According to the invention, therefore, we provide a gyroscope designed according to the stated principle, and switching apparatus for periodically reversing the spin direction of the rotor. Since the gyroscope is ineffective as a stabilizing or reference element during its reversal phase, an additional gyroscope is provided to afford stabilization during this phase. Conveniently, the second gyroscope is similar to the first, and is operated in a similar manner, 90° out of phase, so that each of the two gyros alternately goes through the stabilizing and reversal phases. Alternately, the rotor of one gyroscope may be rotated at constant speed, while that of the other is caused to reverse periodically to monitor the operation of the first gyroscope.

The gyro pair can be arranged as two-axis instruments, or "free gyros," i.e., to provide two reference axes; but it is usually more practical to employ them as single-axis instruments. This requires, then, two gyros to define a single stabilization axis, or six gyros for a complete stable platform.

Other objects of invention will become apparent from the following description taken in connection with the accompanying drawings, in which FIG. 1 is a schematic electrical diagram of the invention as applied to a single axis platform;

Figures 4, 11:
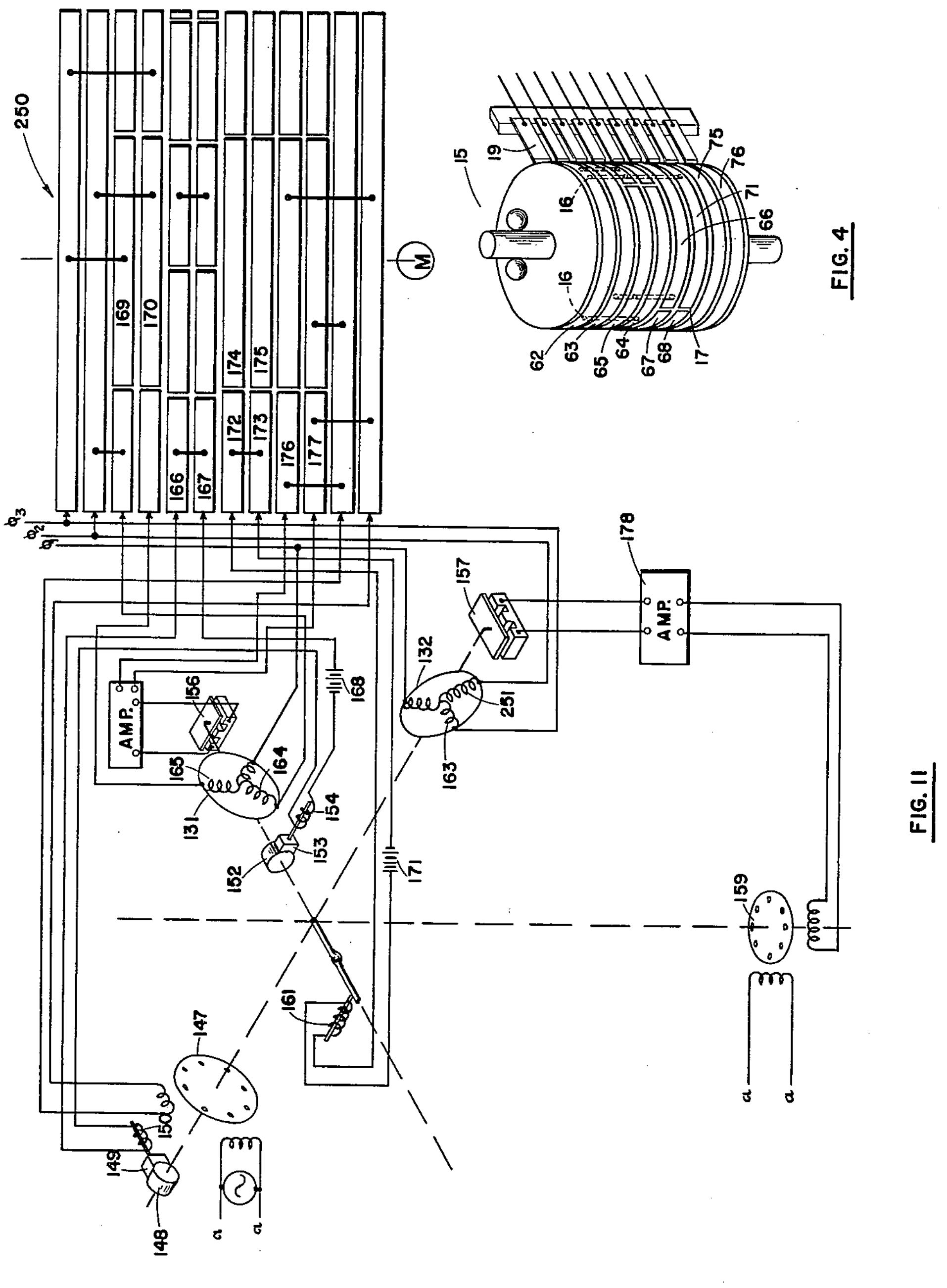
FIG. 4 is a detailed view of the sequence switching device of this invention.
FIG. 11 is an electrical diagram of a modified form of the invention.
Figure 13:
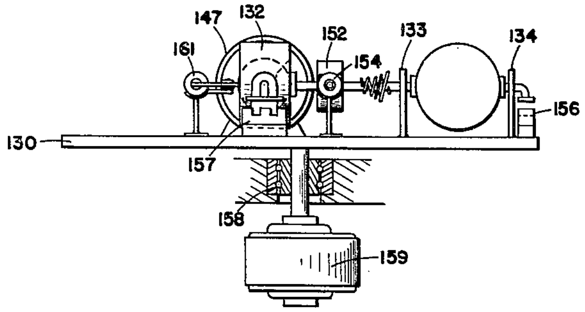

And FIG. 13 is an elevational view of the device shown in FIG. 11.

Figure 1:
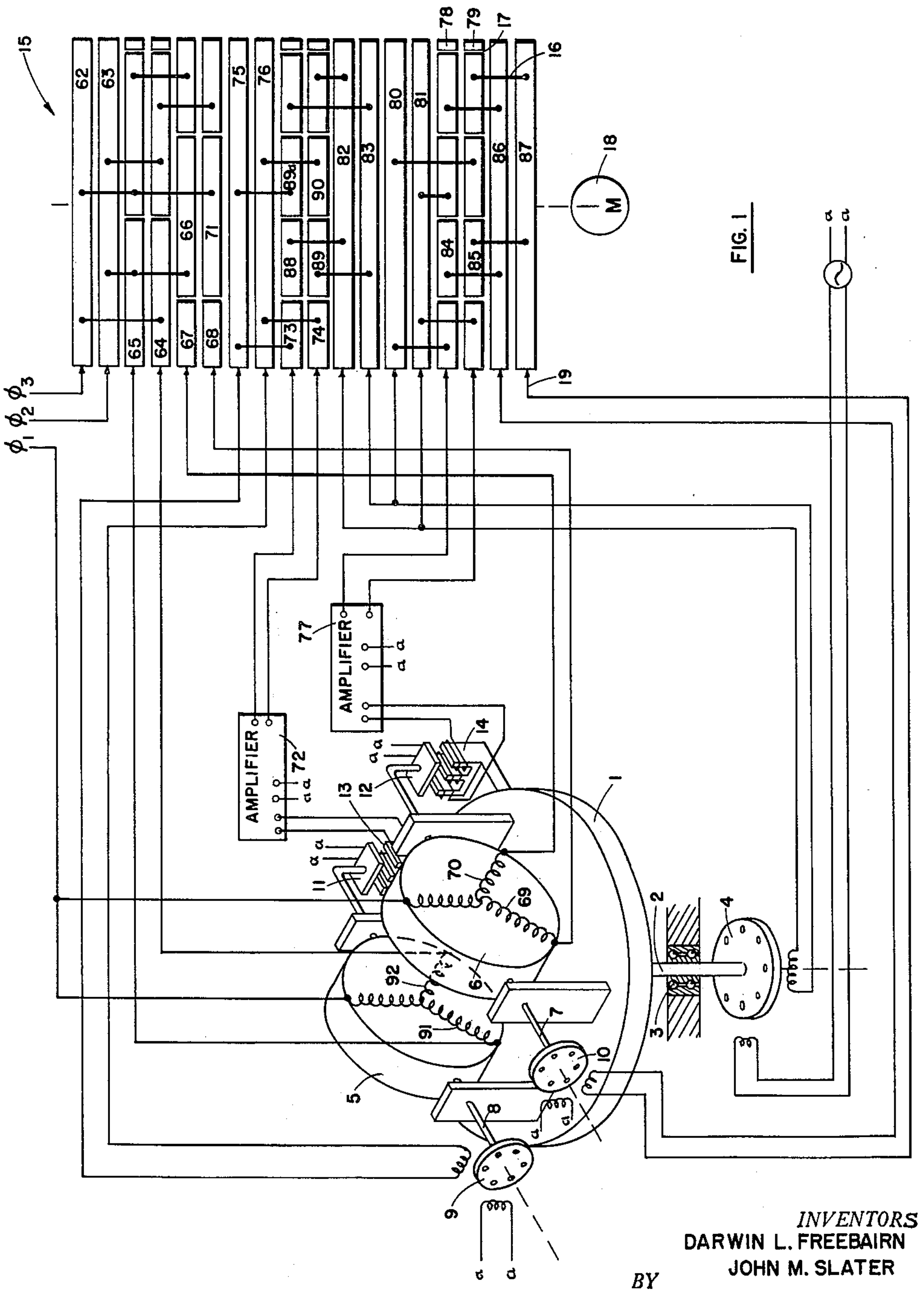

Referring now to FIG. 1, there is shown a platform 1 having freedom for rotation on a vertically disposed axle 2 supported by a bearing 3 on some solid structure.

Axle 2 is connected to torque motor 4 and defines an axis of rotation hereinafter and commonly referred to as an input axis for the associated gyroscopes to be subsequently described. Supported on platform 1 for a single degree of angular freedom about a precessional axis are gyroscopes 5 and 6. Gyroscope 5 is supported on precessional axis 8, and gyroscope 6 is supported on precessional axis 7, these axes being normal both to the spin axes of the gyroscopes and to the stabilizing or input axis 2 of the platform and therefore, equiangularly arranged. These precessional axes of the gyroscopes are denoted output axes, since any motion of the platform about the input axis causes a corresponding output rotation of the gyroscope stators about these axes. Torque motors 9 and 10 are attached to precession axes 8 and 7, respectively, as are elements 11 and 12 of E pickoffs 13 and 14. The motor windings of gyroscopes 5 and 6 are represented schematically, as shown, and are connected to various conducting strips on a rotating drum 15 shown in developed form in FIG. 1. Drum 15 is a rotary sequence switch, and the representation of it shown in FIG. 1 indicates conductive strips as closed, relatively broad rectangles separated by narrow insulating strips. The points at which the various conducting strips are tied together and broken are indicated, for example, at 16 and 17, respectively, in FIG. 1. A perspective view of a portion of drum 15 is shown in FIG. 4, this view being typical for the purpose of showing the configuration not only of drum 15 but also of the sequence switching devices shown in FIGS. 9, 10, and 11. Drum 15 is rotated at a uniform speed of one revolution in 20 seconds, for example, by a motor 18. As the drum moves, suitable contacts indicated by arrows at 19 in FIG. 1 make the necessary circuits for periodically reversing the gyroscopes one at a time, connecting the pickoff of each one of the gyroscopes to the windings of platform torque motor 4 during its "active phase," and connecting the pickoff of each gyroscope to its own torquer (9 or 10) to cage it during the revresal phase. Provision is also made for reversing the platfrom torquer in its energization according to the direction of spin of the gyroscope.

Figures 2, 5:
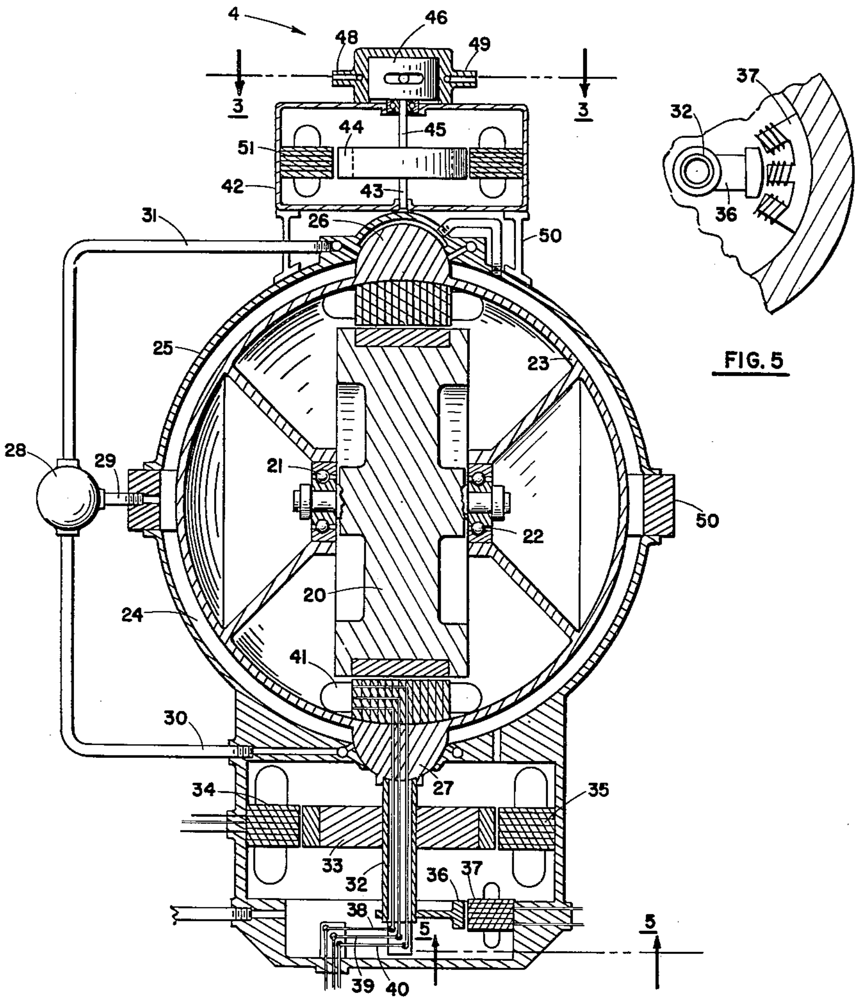
FIG. 2 is a detailed sectional view of the gyroscope of this invention.
FIG. 5 is a sectional view taken at 5—5 in FIG. 2.
Figure 3:
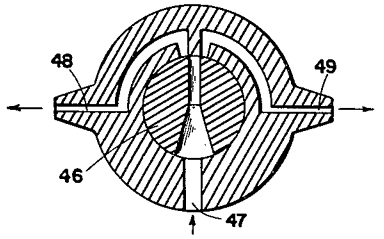
FIG. 3 is a sectional view taken at 3—3 in FIG. 2.

Referring now to FIG. 2, each gyroscope comprises a rotor 20 supported by bearings 21 and 22 in a hollow sphere 23 which, in turn, is supported by a flotation medium 24 in a casing 25. Flotation medium 24 is furnished to end bearings 26 and 27 by pump 28 which draws fluid from return conduit 29 and furnishes it to supply conduits 30 and 31. End bearings 26 and 27 could be replaced by air bearings of the type shown in application Serial No. 154,902 entitled "Zonal Ball Air Bearing" filed April 10, 1950, now Patent No. 2,617,695, in the name of Vernon A. Tauscher and John M. Slater, the requirement insofar as this invention is concerned being that the end bearings have equal friction in either direction—a requirement not always satisfactorily met by conventional ball or roller-type bearings. End bearing 27 is attached to shaft 32 of two-phase induction motor rotor 33 whose fields are shown at 34 and 35 in FIG. 2. Also connected to shaft 32 is rotor 36 positioned opposite E pickoff 37 shown in detail in FIG. 5. Electrical energy for the rotation of the gyroscope is furnished through flexible lead-ins 38, 39, and 40 which connect to the stator windings 41 of the gyroscope. Also situated on the gyroscope in FIG. 2, for convenience, is platform torque motor 4 consisting of a casing 42 mounted rigidly on stator casing 25 of the gyroscope. Casing 42 has attached to it a torsion rod 43 which mounts two-phase induction motor rotor 44. This is a conventional two-phase induction motor with the exception that the rotor is rigidly attached to torsion rod 43 which, in turn, is fixed to casing 42. The rotation of rotor 44 is, therefore, somewhat restricted. Shaft 45, attached to rotor 44, is connected to rotatable valve element 46, also shown in FIG. 3. Air is supplied at a constant pressure to input port 47, and is exhausted through jets 48 or 49, depending upon the direction in which the platform to which the gyroscope is attached must be torqued in order to correct its orientation to correspond to that of the particular gyroscope which is "in command" at the time. The schematic showing of the invention in FIG. 1 indicates the torquer attached to the platform proper, while in FIG. 2, the torquer is shown attached to the gyroscope, which, in turn, is attached to the platform by mounting flange 50. For the purposes of this invention it is immaterial whether the torquer acts directly on the platform or on the gyroscope attached to the platform. In FIG. 2, as current is applied to the induction motor windings 51, torsion rod 43 yields enough to allow air furnished through supply port 47 to be passed either to jet 48 or to jet 49. The impulse of these jets then supplies sufficient torque to the platform to correct its orientation.

An important feature of this invention, shown in FIG. 2, is the use of flexible lead-in wires for furnishing power to the gyroscope. These lead-ins may be of an absolute minimum number because no electrical lead-ins are required to furnish power to rotors 33 or 36 of the gyroscope torquer and pickoff, respectively. Little, if any, restraint, therefore, is placed upon the gyroscope because of power requirements; hence the disturbing torque characteristics of the gyroscopes may be kept independent of the direction of spin of the gyroscopes' rotors.

Figure 6:
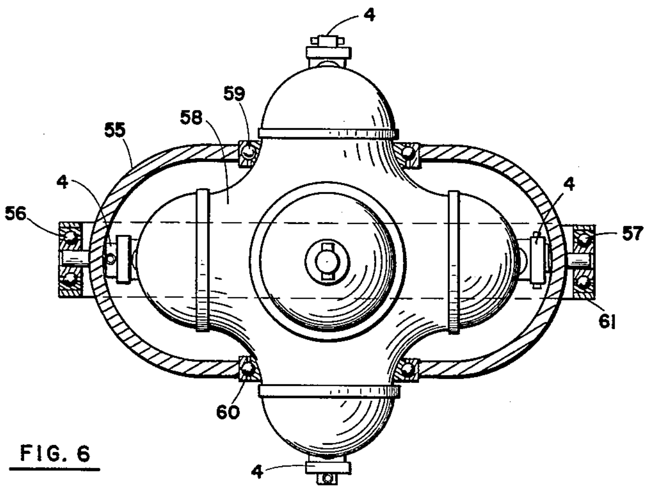
FIG. 6 is an elevational view of a 3-axis platform stabilized by this invention.
Figure 7:
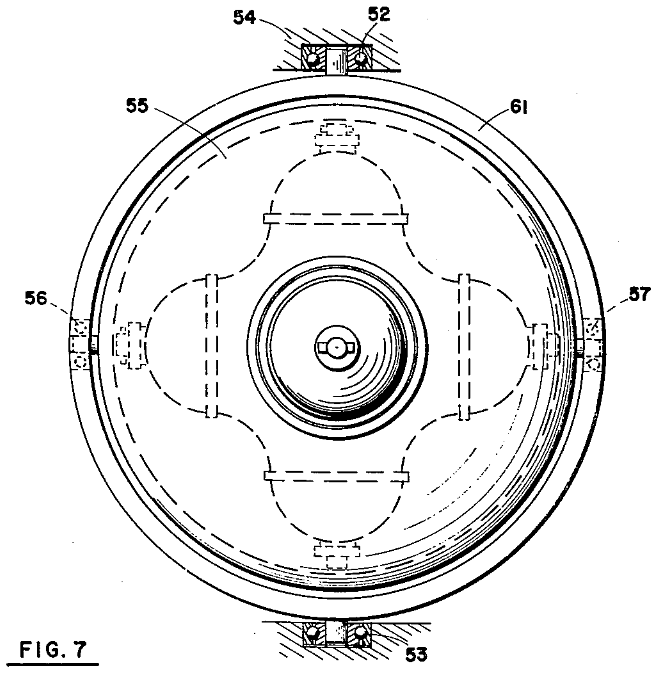
FIG. 7 is a plan view of the device shown in FIG. 6.

Turning now to FIGS. 6 and 7, there is shown a three-axis embodiment of the invention applied to a platform having three degrees of angular freedom. Outer gimbal ring 61 is supported by bearings 52 and 53 in fixed structure 54 of the vehicle or apparatus being navigated. Outer gimbal ring 61 supports casing 55 on bearings 56 and 57. In a similar manner, platform 58 is supported on bearings 59 and 60 in frame 55. Platform 58 supports six gyroscopes with their precession axes mutually orthogonally disposed. Torquers 4 are arranged parallel to the spin axes of the gyroscopes to which they are attached, as shown in FIG. 2. The arrangement of the invention shown in FIGS. 6 and 7 is the three-dimensional extension of the device shown in FIG. 1, and, of course, carries with it a similar arrangement of pickoffs, torquers, and sequence switches as shown in FIG. 1, for each pair of gyroscopes shown in FIG. 6.

Referring again to FIG. 1, the following is the sequence of events which occur as drum 15 is rotated through one full revolution: At the beginning of the cycle to be described, three-phase power is supplied to conducting strips 62 and 63 which are connected to strips 64, 65, and 66, as indicated in FIG. 1. It will be observed that strips 67 and 68 are connected indirectly to strips 62 and 63, respectively. In a similar manner strip 66 is connected to strips 65 and 63. With contacts made as indicated by the arrows in FIG. 1, then, all windings of the gyros are connected to power, and, therefore, the gyros are rotating. Winding 69 is connected to phase-2 power, and winding 70 is connected to phase-3 power. This condition prevails as the drum rotates slowly to the left, in FIG. 1, until a point slightly beyond a 45° rotation is reached. At this point, strips 67 and 68 terminate and windings 69 and 70 of gyro 6 are connected to strips 66 and 71 of the drum. Strip 66 is connected to phase 2 of the three-phase power supply, while strip 71 is connected indirectly to phase 3 of the power supply. Winding 69 is therefore switched from phase-2 power to phase-3 power, and winding 70 is switched from phase-3 power to phase-2 power. This reversal in phase causes the reversal of the direction of rotation of gyro 6.

Consider, now, what happens to the pickoff and torquer connections during this first 45° of rotation of drum 15. At zero degrees, the pickoff of gyro 5 is connected through amplifier 72 to strips 73 and 74. These strips in turn are directly connected to strips 75 and 76 which are connected to the control winding of torque motor 9. It is therefore seen that at the beginning of the cycle being described, gyro 5 is caged by its own pickoff signal, i.e., the pickoff signal is amplified and used to drive the torque motor of gyro 5 to thereby rotate precession axis 8 of gyro 5 in such a sense as to reduce the pickoff signal to zero. The pickoff of gyro 6 is connected by amplifier 77 to strips 78 and 79, which in turn are connected directly to strips 80 and 81. These, in turn, connect to the input winding of platform torque motor 4 and to strips 82 and 83. It is therefore seen that at the beginning of the cycle, torque motor 4 controlling the orientation of the platform is controlled by control signals derived from gyro 6 which is then in the "active" phase. Torque motor 10, for applying torque to gyro 6, is not energized at this time, so that gyro 6 is free to rotate about its precession or output axis with respect to the platform.

When the drum has rotated 45°, strips 78 and 79 are terminated, and amplifier 77 is connected to strips 84 and 85. Shortly thereafter, or at an angular displacement of a little more than 45° from the initially assumed position of the brushes or contact rollers indicated by arrows in FIG. 1, strips 73 and 74, as well as strips 67 and 68 terminate. At this point, as previously indicated, the direction of rotation of gyro 6 is reversed by interchanging the power phases of windings 69 and 70 of the motor of gyro 6. In addition, amplifier 72 is now connected to strips 82 and 83 which are connected to the control winding of platform torque motor 4. Gyro torque motor 9 is disconnected from pickoff 13, and gyro 5 enters its "active" or controlling phase. The platform is thereafter caused to respond to control signals derived from gyro 5 and is slaved to gyro 5. Amplifier 77 is connected to strips 84 and 85 which are in turn connected to strips 86 and 87 connected to gyro torquer 10 so that gyro 6 is now caged while it undergoes its reversal phase. This condition obtains until drum 15 has been rotated through an angle slightly greater than 135°, where strips 64, 65, 88, 89, 84, and 85 terminate. Strips 64, 65, 84, and 85 terminate exactly when strips 88 and 89 terminate so that the power connections to gyro 5 are reversed precisely when the control connections to the torquers are changed. After this switching occurs, amplifier 72 is connected to strips 89*a* and 90. Windings 91 and 92 of gyro 5 are switched from phase-2 to phase-3 power and from phase-3 to phase-2 power, respectively, so that the direction of rotation of gyro 5 is reversed. During this period, gyro 5 is caged by its own pickoff signal in the manner previously described. Gyro 6 is now in control, with its pickoff signal connected with opposite sense (relative to the sense of its connection from 0° to 45°) to the control winding of platform torque motor 4. Switching in a similar manner is accomplished at drum rotation angles of slightly more than 225° and slightly more than 315°, as indicated in FIG. 1, so that as the drum continues to rotate, gyro 5 alternates with gyro 6 in controlling platform torque motor 4 and in caging itself in reversing direction of rotation.

The effect of this periodic reversal of the gyroscopes one at a time and periodic change in the control of the platform from one gyroscope to the other in turn is to compensate for the unknown error torques which originate in the gyroscope or gyroscope precession axis bearings, and which are independent of spin direction of the gyroscope. This self-compensation feature may be demonstrated mathematically with only the assumption of two gyroscopes having parallel input axes, and that it is either possible to measure or to predetermine the gyroscope output axis torques and to change the angular momentum of at least one of the two gyroscopes. The total torque on the gyro output gimbal is:

$$L_z = I_z\dot{\omega}_z - \omega_y\omega_x(I_x - I_y) - \omega_y\dot{\tau}I_x \qquad (1)$$

where $x$, $y$, $z$ are the spin, input, and output axes, respectively; $\dot{\tau}$ is the rotor velocity; and $I_x$ its moment of inertia.

Set $\dot{\tau}I_x = H$

This is the angular momentum of the gyro.

$\omega_z$ gives the angular velocity of the gyro output gimbal relative to inertial space.

$\omega_y$ is the component of velocity about the gyro input axis.

$L_z$ is assumed to be the sum of known or measurable torques $k$ plus all the erratic, unpredictable error torques $e$ then:

$$L_z = k + e \qquad (2)$$

$$\omega_y\omega_x(I_x - I_y)$$

is negligible compared to $$\omega_x\dot{\tau}I_y \qquad (3)$$

since $$\dot{\tau} >> \omega_x$$

Combining Equations 2 and 3 with Equation 1 gives:

$$e + k = I_z\dot{\omega}_z - \omega_y H \qquad (4)$$

showing the input velocity $\omega_y$ to be dependent upon the erratic torques $e$.

The gyro to be used in this system must be one for which it is possible to change H without an appreciable change in $e$.

Then for two times $T_1$ and $T_2$ $$e_1 - e_2 = 0 \qquad (5)$$

where $e_1$ and $e_2$ indicate e at times $T_1$ and $T_2$, respectively.

Writing Equation 4 at times $T_1$ and $T_2$:

$$(a)\quad e_1 + k_1 = (I_z\dot{\omega}_z)_1 - (\omega_y H)_1 \qquad (4)$$

$$(b)\quad e_2 + k_2 = (I_z\dot{\omega}_z)_2 - (\omega_y H)_2$$

Subtracting $(b)$ from $(a)$:

$$(k_1 - k_2) + (\omega_y H)_1 - (\omega_y H)_2 = (I_z\dot{\omega}_z)_1 - (I_z\dot{\omega}_z)_2 \qquad (6)$$

This is an equation containing two unknown values: $\omega_{y1}$ and $\omega_{y2}$.

Provided with a second gyro there will be a second equation similar to Equation 6, but since the second gyro is on the same platform it also has the same $\omega_{y1}$ and $\omega_{y2}$ at times $T_1$ and $T_2$. This means that there are two equations in two unknowns, and therefore the original proposition is proved, namely, that a gyro system can be devised to measure its own error.

For the special case when the angular momentum of the gyro is completely reversed $$H_1 + H_2 = 0$$

With the gyro caged upon itself by torque $k$, $\dot{\omega}_z$ is essentially zero. Here $\int\omega_z dt$ is the gyro output angle.

For the reversed gyro then:

$$\Delta k = \omega_{y2}H_2 - \omega_{y1}H_1$$

The platform is controlled by the second gyro during reversal, with the control criterion being $$\int\omega_z' dt \rightarrow 0$$

and $$\Delta k' = 0$$

This makes $$\omega_{y2} = \omega_{y1} = \omega_y$$

Thus, for the reversed gyro $$\Delta k = 2\omega_y H_2$$

and $$\omega_y = \frac{k1 - k2}{2H_2}$$

which is an explicit expression for platform drift in terms of measurable quantities.

Figure 9:
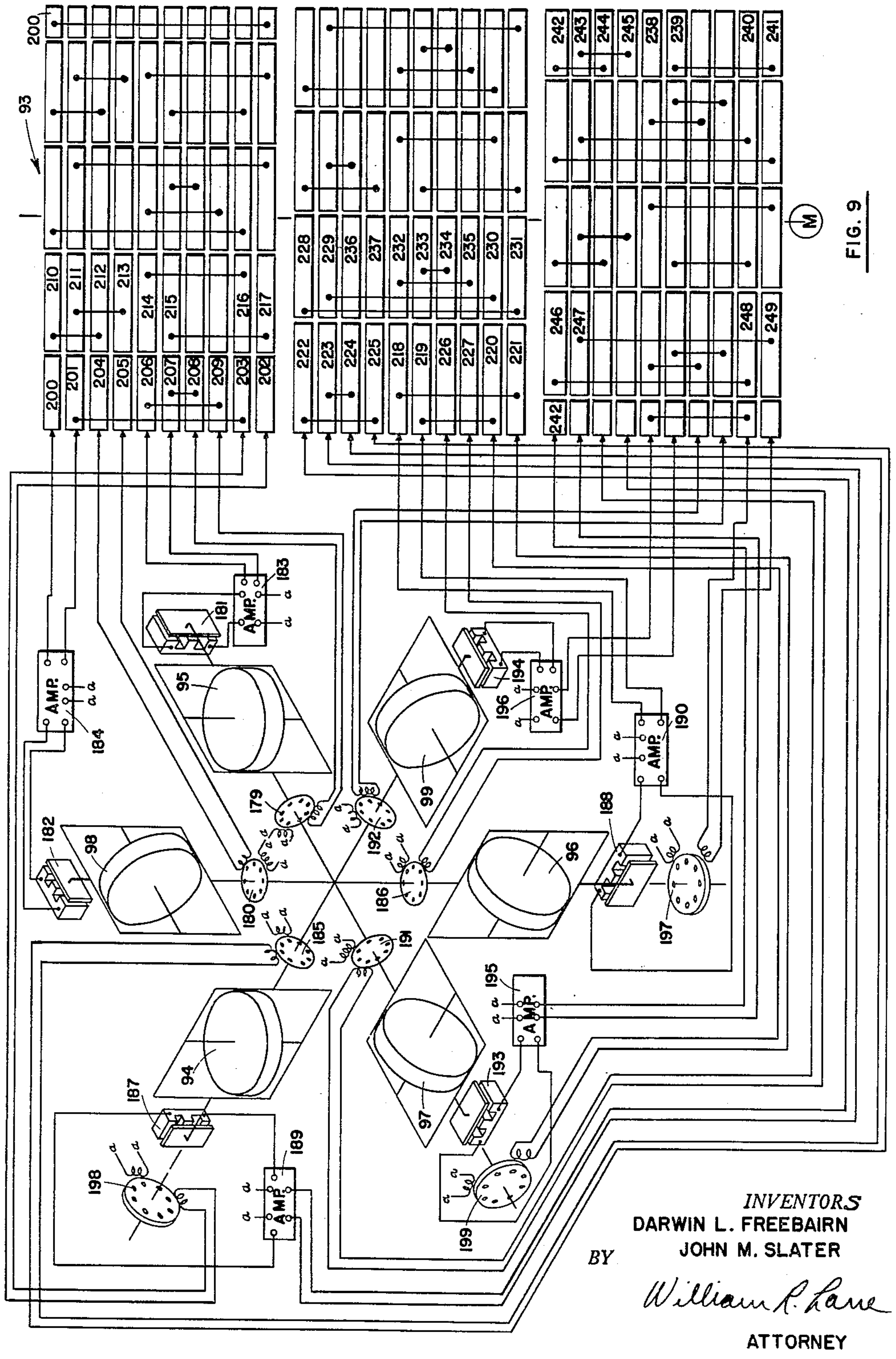
FIG. 9 is a schematic electrical diagram of the torquers, pickoffs, and sequence switching arrangement of this invention.
Figure 10:
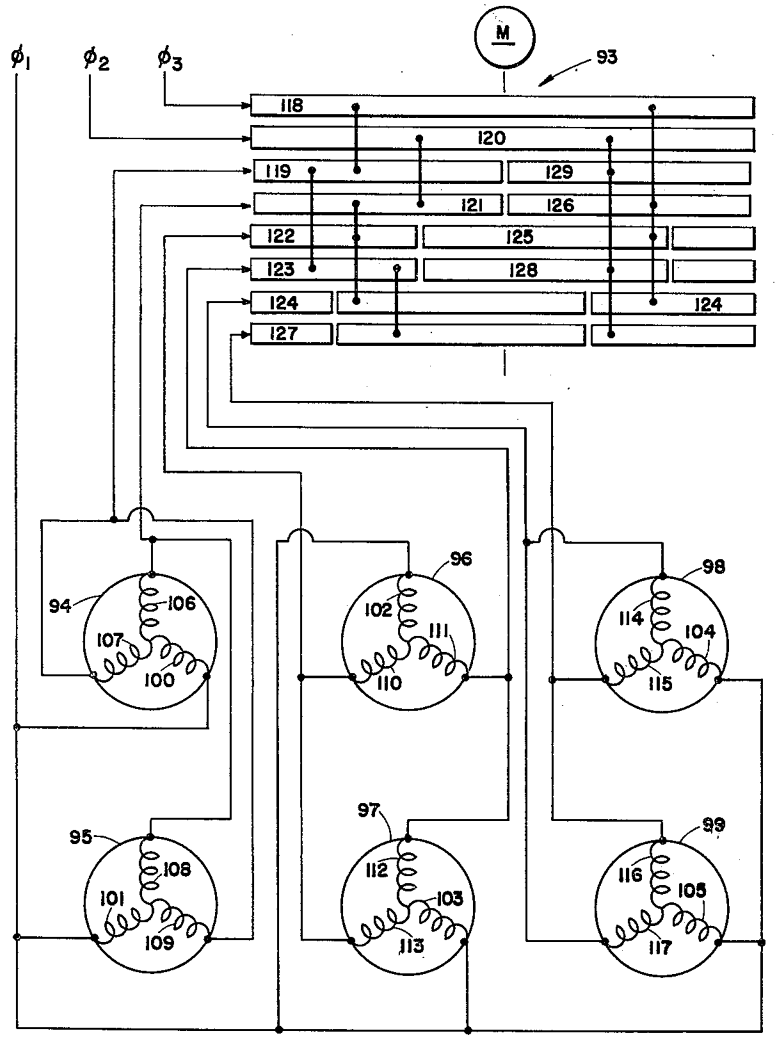
FIG. 10 is an electrical power diagram of the embodiment of the invention shown in FIG. 9.

FIGS. 9 and 10 indicate the extension of the angle axis system shown in FIG. 1 to a three-axis or six gyroscope stabilized platform as indicated in FIGS. 6 and 7. In FIG. 10, drum 93 is partially indicated to the extent of the power-controlling part thereof. Three-phase power is furnished to gyroscopes 94, 95, 96, 97, 98, and 99 in the manner indicated in FIG. 10. Phase 1 is connected at all times to windings 100, 101, 102, 103, 104, and 105. The phase of the power supplied to windings 106, 107, 108, 109, 110, 111, 112, 113, 114, 115, 116, and 117 is periodically reversed in a manner similar to that disclosed in connection with the previous discussion of FIG. 1. At zero degrees, winding 107 is connected to phase-3 power by strips 118 and 119. Winding 106 is connected to phase-2 power by strips 120 and 121. Windings 108 and 109 are connected in parallel with windings 106 and 107, respectively, so that gyroscopes 94 and 95 rotate together in opposite directions. Winding 110 and 113 are connected through strips 122, 121, and 120 to phase-2 power, while windings 111 and 112 are connected through strips 123, 119, and 118 to phase-3 power. Gyroscopes 96 and 97 therefore rotate together in opposite directions. Windings 115 and 116 are connected through strips 127, 128, 129, and 120 to phase-2 power. Windings 114 and 117 are connected through strips 124, 125, 126, and 118 to phase-3 power so that gyroscopes 98 and 99 rotate together in opposite directions. At a position corresponding approximately to 60° the direction of rotation of gyroscopes 98 and 99 is reversed by the reversal of phase of the power supplied to windings 114, 115, 116, and 117. At an angular position corresponding to a 120° rotation of drum 93, the direction of rotation of gyroscopes 96 and 97 is reversed by interchanging the phase of the power supplied to windings 110, 111, 112, and 113. At an angular rotation of the drum of 180° the direction of rotation of gyroscopes 94 and 95 is reversed by interchanging the phase of the power supplied to windings 106, 107, 108, and 109 in the same manner as is described in connection with the device shown in FIG. 1.

Referring to FIG. 9, gyroscopes 94 and 95 are so arranged on the platform that the effect of the acceleration and deceleration of their rotors during the reversal phase of their operation cancels out. In other words, since these gyroscopes are connected to be operated with opposite spin directions at all times, during the reversal phase the reaction torques upon the platform due to their deceleration and acceleration in the opposite direction oppose each other and therefore have no net effect in applying the torque to the platform. Likewise, the acceleration torques of gyroscopes 96 and 97 cancel each other, and the acceleration effects of gyroscopes 98 and 99 cancel each other, as can be seen from FIG. 9.

Figure 8:
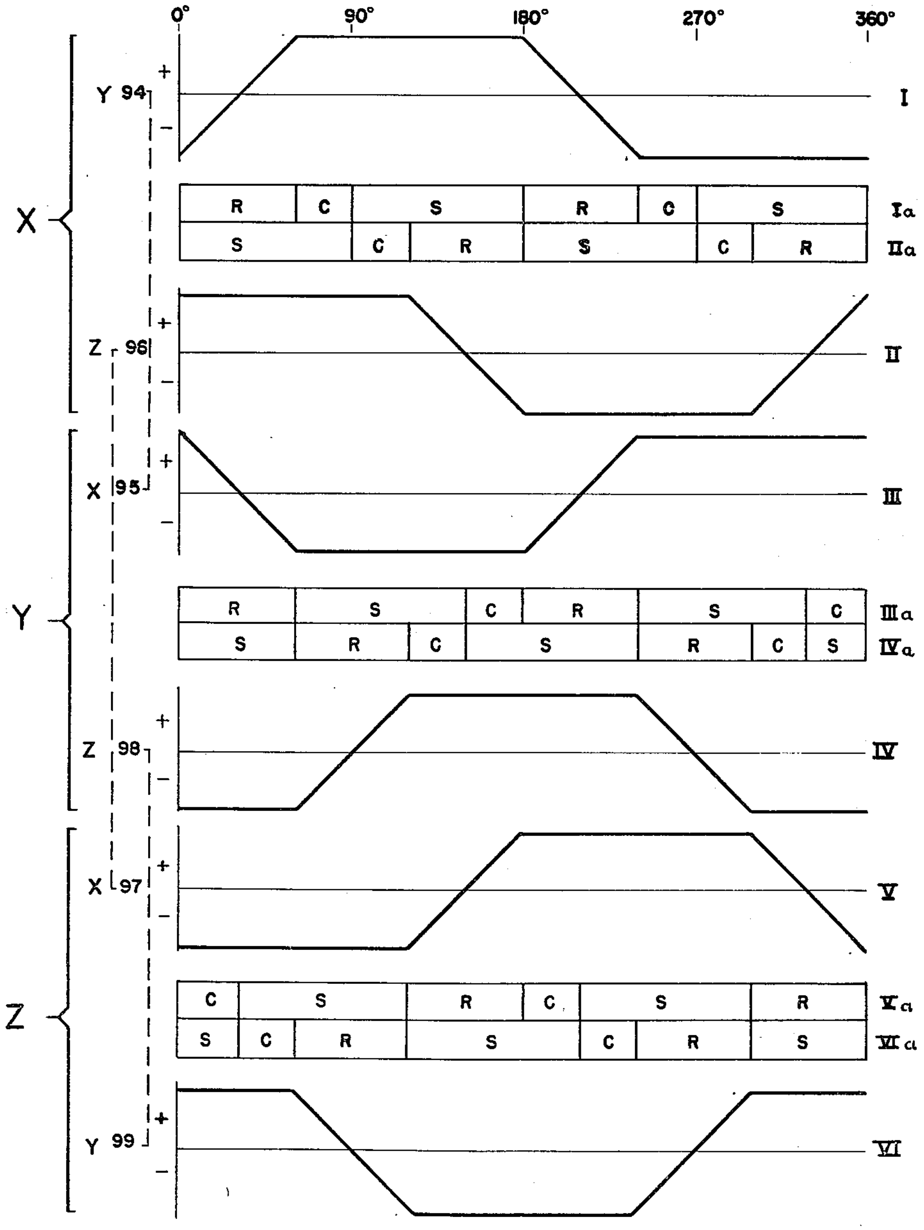
FIG. 8 is a graph showing the rotor rotational velocities of the various gyroscopes plotted against the rotation of the switching device used in this invention.

FIG. 8 shows gyroscope rotor rotational velocity plotted against the rotation of drum 93 in summary form. In plot I gyroscope 94 is shown initially in the process of reversal, as indicated at line I*a*, where R stands for reversal, with the gyroscope caged by its own pickoff signal; C indicates constant rotor velocity with the gyroscope caged; and S indicates that the gyroscope is being used to stabilize the platform. The *x*-axis is stabilized by gyroscopes 94 and 96 and, initially in FIG. 8, gyroscope 96 is being used to stabilize this axis, while gyroscope 94 is being reversed. At a drum rotation of approximately 90° gyroscope 96 is caged, and for the next 90° of drum rotation gyroscope 94 is in its "active" or controlling phase. Gyroscopes 95 and 98 stabilize the *y*-axis, and at the beginning of the period indicated in FIG. 8, gyroscope 95 is undergoing a reversal, while gyroscope 98 stabilizes the platform about the *y*-axis. At a drum rotation of about 60° gyroscope 98 is reversed and gyroscope 95 assumes stabilization of the *y*-axis. Similarly, at the beginning of the period shown in FIG. 8, gyroscope 99 is stabilizing the *z*-axis, while gyroscope 97 is caged preparatory to its assumption of control over the *z*-axis. From FIG. 8 it can be seen that gyroscopes 94 and 95 reverse direction of rotation simultaneously but in the opposite sense, since gyroscope 94 goes from full speed in the negative direction to full speed in the positive direction, while at the same time gyroscope 95 goes from full speed in the positive direction to full speed in the negative direction. Similarly, gyroscopes 96 and 97 reverse together, but in the opposite sense, as do gyroscopes 98 and 99. Plots I, II, III, IV, V, and VI are plots of the angular velocity of the rotors of gyroscopes 94, 96, 95, 98, 97, and 99, respectively, while lines I*a*, II*a*, III*a*, IV*a*, V*a*, and VI*a* provide keys to the functions of gyroscopes 94, 96, 95, 98, 97, and 99, respectively, throughout one full revolution of drum 93. Gyroscopes 94 and 95 commence reversal at zero and 180°; gyroscopes 96 and 97 commence reversal at 120° and 300°; and gyroscopes 98 and 99 commence reversal at 60° and 240° rotation of drum 93. It is to be understood that while the plots of FIG. 8 show gradual reversal of the gyroscopes extended over the maximum permissible time, it is highly likely that complete attainment of full speed in the reversed direction will occur in less time and the gyros remain caged, though at full speed, until they assume stabilization.

Referring to FIG. 9, the three-axis system with its associated gyroscopes, pickoffs, and torquers is shown in detail in relation to sequence switching drum 93. In FIG. 9 gyroscopes 95 and 98 have associated with them output axis torquers 179 and 180, respectively, and output axis pickoffs 181 and 182, respectively. Amplifiers 183 and 184 amplify the outputs of pickoffs 181 and 182, respectively. Similarly, gyroscopes 94 and 96 have associated with them torquers 185 and 186, respectively, and precession or output axis pickoffs 187 and 188, respectively. Signals from pickoff 187 are amplified in amplifier 189, and signals from pickoff 188 are amplified in amplifier 190. Finally, gyroscopes 97 and 99 have associated with them torquers 191 and 192, respectively, and pickoffs 193 and 194, respectively. The output signals from pickoffs 193 and 194 are amplified in amplifiers 195 and 196, respectively. The platform is stabilized about the *y*-axis by torque motor 198; about the *x*-axis by torque motor 199; and about the *z*-axis by torque motor 197. The rotors of torque motors 197, 198, and 199 are understood to be connected to exert torque upon the platform while the stators thereof transmit a reactive torque to external fixed structure or obtain reaction from air jets such as disclosed in FIGS. 2 and 3. Connections marked "*aa*" in FIG. 9 are supplied from a common source of constant frequency alternating current. As drum 93 rotates, connections are made by sliding or rolling contacts indicated by arrows in FIG. 9, with various conducting strips of drum 93 which are interconnected as shown. As drum 93 is rotated to the left in FIG. 9, the platform is controlled in the manner indicated by the various plots shown in FIG. 8. Detailed operation of each of the three axes of angular freedom of the platform shown in FIG. 9 is the same in principle as that described in connection with the single axis embodiment of this invention shown in FIG. 1 with the additional feature, of course, that the platform experiences no torques due to the acceleration and deceleration of the gyroscope rotors, inasmuch as rotors accelerate and decelerate simultaneously in pairs with opposing reaction torques as hereinbefore described.

At the beginning of the cycle indicated in FIG. 8, and considering first the *y*-axis stabilization, it is seen that gyroscope 98 is being used for the purpose of stabilizing the platform about the *y*-axis. Consequently, the output of amplifier 184 is connected to strips 200 and 201. Since strip 200 is connected to strip 202, and since strip 201 is connected to strip 203 within the drum, the amplified output of pickoff 182 is fed to the control winding of torque motor 198 which controls the orientation of the platform about the *y*-axis. Torquer 180, meanwhile, is connected to strips 204 and 205 which are not connected to any other strips on the drum; hence, torquer 180 is not energized. Meanwhile, gyroscope 95 is undergoing reversal; hence the output of amplifier 183 is connected to strips 206 and 207 which, in turn, are connected within the drum to strips 209 and 208, respectively. These strips are connected to the control winding of torquer 179 so that the amplified output of pickoff 181 of gyroscope 95 is fed back to the gyroscope's own torquer, thus caging the gyroscope during its reversal phase. At an angular rotation of the drum of approximately 60° amplifier 184 connects with torque motor 180 through strips 210, 211, 212, and 213 interconnected within the drum as shown in FIG. 9. At this point also, gyroscope 98 commences reversal, as shown in FIG. 8, and gyroscope 95 assumes stabilization of the platform about the $y$-axis. Hence the amplified output of pickoff 181 is connected to control winding of torque motor 198 through strips 214, 215, 216, and 217. At angles of 150°, 240°, and 330° similar reversals of these connections occur as indicated in FIG. 9.

At the beginning of the cycle shown in FIG. 8, and considering now the $x$-axis stabilization, gyroscope 96 is in control of the $x$-axis of the platform. Hence the output of amplifier 190 is connected to the control winding of platform torquer 199 through strips 218, 219, 220, and 221. Similarly, the amplified output of pickoff 187 of gyroscope 94 is connected to gyroscope torquer 185 through strips 222, 223, 224, and 225. At this time, gyroscope torquer 186 is connected to strips 226 and 227, thus preventing its energization. At an angular rotation of approximately 90° strips 218—227 terminate, as shown in FIG. 9, and gyroscope 94 assumes stabilization of the $x$-axis. This is accomplished by the connection of the amplified output of pickoff 187 to the control winding of torquer 199 through strips 228, 229, 230, and 231. Torquer 186 is energized by the amplified output of pickoff 188 on gyroscope 96 through strips 232, 233, 234, and 235, while torquer 185 is left unenergized by connection to strips 236 and 237. Similar reversals in the control of the $x$-axis stabilization of the platform occur at angular rotations of drum 93 of 180°, 270°, and 360°, as indicated in the central section of the drum as shown in FIG. 9.

At zero degrees rotation of the drum, the $z$-axis is stabilized by gyroscope 99, while gyroscope 97 is caged in preparation for its assumption of control at a drum rotation of approximately 30°, and the amplified output of pickoff 194 on gyroscope 99 is connected to strips 240 and 241. Platform torquer 197 is energized by connection to strips 240 and 241. Meanwhile, the amplified output of pickoff 193 on gyroscope 97 is fed to torquer 191 through strips 242, 243, 244, and 245. At a drum rotation of approximately 30°, gyroscope 97 takes over stabilization of the $z$-axis of the platform, and the amplified output of pickoff 193 is used to drive platform torque motor 197 through strips 246, 247, 248, and 249. Similar changes in the control of the $z$-axis stabilization of the platform by alternation of gyroscopes 97 and 99 occur at drum 93 rotations of 120°, 210°, and 300°.

If the rotation of drum 93 is followed throughout 360° it will be seen that the stabilization of the platform is accomplished in accordance with the plots shown in FIG. 8. All gyroscopes are caged during reversal, and are caged for a time after they have reached full speed in the reversed direction so that uniform operation may be secured despite small variations in reversal time which might occur between the various gyroscopes.

With the arrangements of the invention shown in FIG. 1 and in FIGS. 9 and 10, the platform torque motor energization undergoes periodic reversal so that the net platform error is reduced essentialy to zero over a long period of time. If we were to plot the platform torque motor energization against time, a saw-tooth curve would result with an average value approaching zero. It would therefore seem desirable for the purpose of obtaining instantaneously correct platform orientation at all times to employ some technique of smoothing. Smoothing may be accomplished mechanically by the scheme shown in FIGS. 11, 12, and 13 of this application.

Figure 12:
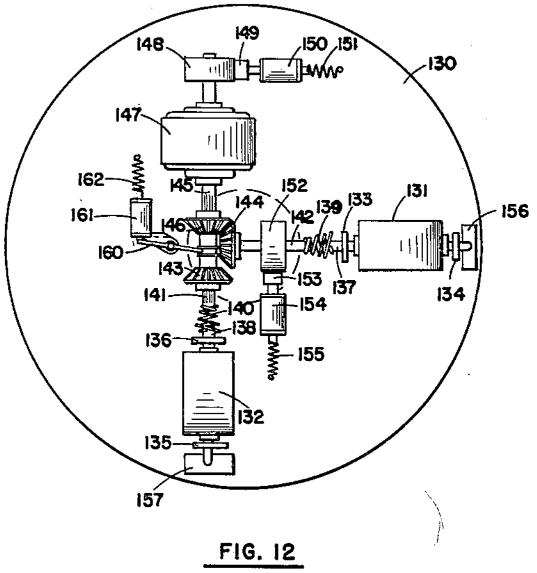
FIG. 12 is a plan view of the device shown in FIG. 11.

Referring to these figures, there is shown a platform stabilized about a single vertical axis, hereinafter referred to as the input axis. In FIG. 12, platform 130 supports gyroscopes 131 and 132 on bearing supports 133, 134, 135, and 136. Gyroscopes 131 and 132 are thus supported on their precessional or output axes, and shafts 137 and 138 are attached to these gyroscopes and to torsion springs 139 and 140. Torsion springs 139 and 140 are also attached to shafts 141 and 142 and are driven by gears 143 and 144. Gear 143 is splined to shaft 145 which drives gear 144 through gear 146. Shaft 145 is driven by motor 147. Brake drum 148 is attached to the shaft of motor 147 and may be restrained by friction against brake shoe 149 operated by the cooperation of solenoid 150 and spring 151. Likewise, brake drum 152 is attached to shaft 142 and may be braked by brake shoe 153 operated by the cooperation of solenoid 154 and spring 155. The angular motion of gyroscope 131 about its output axis is detected by pickoff 156, while the angular motion of gyroscope 132 about its output axis is detected by pickoff 157. Platform 130 is supported rotatably in bearing 158 and may be rotated about a vertical axis by platform torque motor 159. An electrical schematic of this platform is shown in FIG. 11, along with its associated gyroscopes, pickoffs, and torquers. Gears 143 and 146 may be shifted along splined shaft 141 by means of gear shift 160 operated by solenoid 161 and spring 162.

It is desired that platform 130 be made rotationally stable about the vertical or input axis. While the output axis supports for gyroscopes 131 and 132 are shown schematically as simple support bearings, it is important that these gyroscopes be suspended or floated in a fluid; carried on a flexure or on cross spring pivots, or on gas or fluid dynamic bearings such as shown in connection with the gyroscope of FIG. 2; or otherwise supported so that disturbing torques originating in these bearings will be substantially independent of the spin direction of the gyroscopes.

Referring now to FIG. 11, the sequence of operation of the gyroscopes and associated pickoffs is controlled by a drum sequence switch similar to that shown in FIGS. 1 and 9. At zero degrees rotation of drum 250, phase-2 power is supplied to winding 251 of gyroscope 132, while phase-3 power is supplied to winding 163 thereof. Phase-2 power is supplied to winding 164 of gyroscope 131, while phase-3 power is supplied to winding 165 thereof. At an angular rotation of the drum corresponding to slightly less than 90° conductor strips 166 and 167 are broken, disconnecting battery 168 from solenoid 154 and allowing spring 155 to push brake shoe 153 against brake drum 152. Shortly thereafter the direction of rotation of gyroscope 131 is reversed by the reversal of phase of the power supplied to windings 164 and 165 through strips 169 and 170. At this time also, energization supplied to solenoid 161 from battery 171 is broken when the contact points move from strips 172 and 173 to strips 174 and 175. Braking by means of brake shoe 149 and drum 148 occurs simultaneously with braking by brake drum 152, as is indicated in FIG. 11. Null type pickoff 156 of gyro 131 is connected through strips 176 and 177 to the control winding of torque motor 147 at the beginning of the cycle, while pickoff 157 of gyroscope 132 is connected at all times through amplifier 178 to the control winding of platform torque motor 159.

What happens during the cycle can briefly be summarized as follows: The precession of gyroscope 131, as indicated by its pickoff 156, is used to energize torque motor 147 which winds spring 139 by an amount such that the spring torque applied to gyroscope 131 exactly balances the disturbing torque indicated by gyro 131. Meanwhile, spring 138 exerts a torque on gyroscope 132 equal to the torque imposed upon gyroscope 131 by spring 139. Both gyros then have the same total torque-to-angular momentum ratio and hence will tend to have the same precessional rate about the input axis, and will tend to remain at their null positions. The platform and both gyroscopes are then precessing at the same angular rate, since, if in the beginning, gyroscope 131 was precessing in a different rate from gyroscope 132, the winding of springs 138 and 139 has been accomplished in a sense to bring the two precession rates together. Brake drums 148 and 152 are then engaged, gear 144 is moved into engagement with gear 143, and the direction of rotation of gyroscope 131 is reversed. Brake drums 152 and 148 are then released and gyroscope 131, if free, would tend to precess about its input axis in the opposite direction but by the same amount as the platform. Being mounted on the platform, and therefore having the same input rate as gyroscope 132, gyroscope 131 is caused to precess about its output axis. The output signal generated in pickoff 156 by this precession is fed to motor 147, causing springs 139 and 138 to again be wound in the sense necessary to bring the precession rates of the two gyroscopes to equality. But since they are both wound by the same amount, averaging occurs; and since the precession rate of gyroscope 131 was initially equal and opposite to the precession rate of platform and gyroscope 132, the result is that both gyroscopes are brought to zero precession; and since the platform is slaved to gyroscope 132, its drift rate is brought to zero. If thereafter an unpredicted torque appears which causes the drift rates of gyroscopes 131 and 132 to become unequal they are again brought to equality at zero by repetition of the above sequence as determined by the rotation of drum 250.

The embodiment of the invention just described may be compounded into a two or three axis system in much the same manner as the embodiment shown in FIG. 1 was used to achieve the embodiment of the invention shown in FIGS. 9 and 10. Such a system is characterized by having six gyroscopes arranged so that each pair similar to the pair shown in FIGS. 12 and 13 stabilizes a single axis of freedom of a platform universally supported by a conventional gimbal system or by a central ball support such as disclosed in patent application Serial No. 81,374 filed March 14, 1949, now abandoned in the names of John M. Slater, Robert M. Benson, and Vernon A. Tauscher, for Gyro-Stabilized Platform. It is to be understood that all the embodiments of the invention herein disclosed are but slight variations of the device shown in FIG. 1 and disclosing the basic invention comprising a pair of gyroscopes, at least one of which is periodically reversing, and means for applying corrective torques to the supporting platform and the gyroscopes in response to differences in drift rate resultant from the gyroscope reversals.

Although the invention has been described and illustrated in detail, it is to be clearly understood that the same is by way of illustration and example only and is not to be taken by way of limitation, the spirit and scope of this invention being limited only by the terms of the appended claims.

We claim:

1. In a gyro stabilized device a pair of gyroscopes having disturbing torque characteristices independent of spin direction oriented with a common input axis and output axes normal thereto, pickoff means for detecting precession of said gyros about their output axes relative to said stabilized device, torquer means for applying torques to the output axis of each gyroscope, torquer means for applying a torque to said input axis of said gyro stabilized device in response to signals from said pickoff means, and sequence switch means for periodically reversing the direction of rotation of each gyroscope alternately, controlling said platform torquer means in response to each of said pickoff means associated with each gyroscope, and reversing the sense of the torque applied by said platform torquer in coordination with the direction of rotation of said gyroscopes whereby substantially all output-axis disturbing torque influencing said gyroscopes is compensated.

2. A device as recited in claim 1 in which said sequence switch means comprises a cylindrical drum having a plurality of alternately conducting and nonconducting strips around its periphery, said strips being broken at predetermined intervals and predeterminately interconnected; a plurality of contacts adapted to conduct electricity to and from said strips; and motor means for rotating said drum at predetermined speed.

3. A device as recited in claim 1 in which said gyroscopes are supported on said stabilized device in fluid-type bearings to thereby assure the nondependence upon spin direction of error torques due to precession axis friction.

4. In a gyro stabilized device a reference frame, a pair of gyros having disturbing torque characteristics substantially independent of spin direction mounted on said frame for angular freedom about parallel precessional axes; servo means for causing said frame to maintain a fixed relative orientation with respect to one of said gyros about an axis normal to said precessional axes; and sequence switch means for periodically reversing the direction of rotation of each gyroscope alternately and controlling said servo means so as to be responsive only to the one of said gyros which is rotating at full speed whereby such disturbing torque influencing said gyroscopes as is independent of the gyroscopes' spin direction is compensated for and said frame experience no cumulative torques.

5. A device as recited in claim 4 in which said gyros are mounted on said frame on fluid-type bearings.

6. A device as recited in claim 4 in which said servo means comprises pickoff means associated with said gyros for generating an electrical signal in response to angular deviations of said reference frame from said gyroscopes, and torquer means for applying corrective torques to said reference frame in response to signals from said pickoff means.

7. A device as recited in claim 4 in which said sequence switch means comprises a cylindrical drum having a plurality of alternately conducting and nonconducting peripheral strips, said conducting strips being broken at predetermined intervals and interconnected predeterminately; contact-making means for conducting electricity to and from said servo means and to said gyros; and motor means for rotating said drum at predetermined speed.

8. A gyro stabilized platform comprising a rigid frame having a single degree of angular freedom, a pair of gyroscopes mounted on said frame, each with a single degree of angular freedom about precessional axes normal to the axis of angular freedom of said frame, servo means responsive to precession of one of said gyroscopes for correcting the angular attitude of said frame, and sequence switch means for periodically reversing the direction of rotation of each gyroscope alternately and for controlling said servo means in response to only the one of said gyroscopes which is not in process of reversal to thereby stabilize said frame and eliminate therefrom the effect of such gyroscope disturbing torques as are independent of the gyroscopes' spin direction.

9. A gyro stabilized platform comprising a frame having three mutually perpendicular input axes defining three degrees of angular freedom, a first pair of similar gyroscopes mounted on said platform for angular freedom about output axes normal to one of said input axes, a second pair of similar gyroscopes mounted on said frame for angular freedom about output axes normal to the second of said input axes, a third pair of similar gyroscopes mounted for angular freedom about output axes normal to the third of said input axes, servo means for applying corrective torques to said frame in response to one of the gyroscopes in each pair of gyroscopes, and sequence switch means for periodically reversing the direction of rotation of each gyroscope in each pair alternately and controlling said servo means in response to the gyroscope in each pair which is not in process of reversal to thereby eliminate the effect on said frame of gyroscope disturbing torques.

10. Gyroscopic apparatus comprising a gyroscope having a rotor and a stator, a stator bearing member defining an output axis transverse to the spin axis of said gyroscope, a second bearing member supporting said stator bearing member defining an input axis transverse to said output axis, drive means for said rotor capable of spinning said rotor either clockwise or counterclockwise, and means for periodically causing said drive means to reverse the direction of spin of said rotor independent of precession of said gyroscope whereby a periodically reversed angular momentum vector is presented to any disturbing torque which may exist about said output axis.

11. Gyroscopic apparatus comprising a first gyroscope having a rotor and a stator, a bearing member defining an output axis transverse to the spin axis of said rotor, a reversible electric motor for spinning said rotor either clockwise or counterclockwise, a second gyroscope having a rotor and a stator, a second bearing member mounting said second gyroscope for motion independent of said first gyroscope about an output axis parallel to the output axis of said first gyroscope, means supporting said bearing members in fixed relation to each other and defining an input axis of said gyroscopes, a reversible electric motor for spinning the rotor of said second gyroscope either clockwise or counterclockwise, and means independent of precession of said gyroscopes for periodically reversing the direction of rotation of said electric motors 90 degrees out of phase with each other whereby a periodically reversed angular momentum vector is constantly presented to any disturbing torque which may exist about said output axes.

12. Gyroscopic apparatus comprising a gyroscope having a rotor and a stator, a stator bearing member defining an output axis transverse to the spin axis of said rotor, a second bearing member defining an input axis transverse to said output axis, reversible drive means for periodically changing the direction of rotation of said rotor, a pickoff operative to detect precession of said gyroscope about said output axis, a torquer operative about said input axis in response to said pickoff, and means for reversing the connections of said pickoff to said torquer in synchronism with reversals in the direction of rotation of said rotor whereby said input axis is maintained substantially independent of disturbing torques on said gyroscope.

13. A device as recited in claim 12 in which said reversible drive means comprises a reversible electrical motor, a source of power for said motor, and a uniformly driven sequence switch for connecting power to said motor.

14. A device as recited in claim 12 in which said reversible drive means comprises a three-phase electrical motor, a source of three-phase alternating current, a cylindrical drum having peripheral conducting strips predeterminately interconnected and insulatingly separated upon its exterior, contact making means for conducting electricity from said source of three-phase alternating current to the conducting strips on said drum and from the conducting strips on said drum to said motor, and means for rotating said drum at uniform low speed.

15. Gyro stabilized apparatus comprising a platform having freedom for rotation about a single axis in space, a first gyroscope having a rotor and a stator mounted on said platform for freedom of rotation about a precession axis normal to the axis of angular freedom of said platform, a second gyroscope having a rotor and a stator mounted on said platform for freedom of rotation about a precession axis normal to the axis of angular freedom of said platform, a pickoff for detecting angular motion of the stator of said second gyroscope about its precession axis, torquer means for applying a torque to said platform about its axis of angular freedom in response to signals from said pickoff, pickoff means for detecting the angular motion of the stator of said first gyroscope about its precession axis, a torsion spring for applying variable torque to the stator of said first gyroscope about its precession axis, a torsion spring for applying variable torque to the stator of said second gyroscope about its precession axis, motor means connected to wind up the torsion spring of said first gyroscope in the sense required to reduce the signal of the pickoff of said first gyroscope to zero and to simultaneously wind the torsion spring of said second gyroscope in the opposite direction, and means for simultaneously periodically changing the direction of rotation of said first gyroscope rotor whereby the angular motion of said platform is essentially eliminated.

16. Gyroscopic apparatus comprising a gyroscope having a rotor, a stator, and stator bearings defining output and input axes, a servo system including a pickoff on said output axis and a torquer on said input axis for servoing said input axis to said output axis, a second gyroscope having a common input axis with said first gyroscope, a servo loop including a pickoff on the output axis of said second gyroscope, torquer means for applying equal and opposite torques to the output axes of said two gyroscopes, and means for periodically reversing the direction of rotation of said second gyroscope to thereby constantly stabilize said gyroscopes about said input axis.

17. A device as recited in claim 16 in which said second servo loop comprises a torsion spring on each of said output axes, and torque motor means responsive to said second gyroscope's pickoff for winding said torsion springs in opposite directions to thereby eliminate precession of said gyroscopes about said input axis.

18. Gyro stabilized apparatus comprising a rigid frame having freedom for rotation about a single input axis, a gyroscope having a rotor and a stator mounted for angular freedom on said frame about an output axis normal to said input axis, a servo loop including a pickoff on said output axis and a torque motor on said input axis for controlling the orientation of said frame in response to said gyroscope, a second gyroscope having a rotor and a stator mounted for angular freedom about an output axis normal to said input axis, a pickoff on the output axis of said second gyroscope, torquer means for applying equal and opposite torques on the output axes of said gyroscopes in response to said last-named pickoff in the sense required to reduce said pickoff signal to zero, and means for periodically reversing the direction of rotation of said second gyroscope to thereby stabilize said frame about said input axis.

19. A device as recited in claim 18 in which said torquer means comprises a torque motor connected to respond to said second pickoff, torsion springs connected to apply torque to said output axes, and gear means for connecting said motor to wind said torsion springs.

20. Gyro stabilized apparatus comprising a rigid frame having a single degree of angular freedom about an input axis, a first gyroscope having a rotor and a stator supported for a single degree of angular freedom on said rigid frame about an output axis normal to said input axis, a servo loop for controlling said rigid frame in response to rotations of said stator about said output axis, a second gyroscope having a rotor, a stator, and driving means for rotating said rotor supported for a single degree of angular freedom about an output axis normal to said input axis, a servo loop for applying simultaneously a torque to the stator of said second gyroscope about said output axis and a torque to the stator of said first gyroscope about said output axis in opposite senses and of such magnitude as to reduce to zero the precession of said second gyroscope about said output axis, and means for periodically reversing the direction of said driving means for said second gyroscope rotor to thereby stabilize said rigid frame about said input axis.

21. Gyro stabilized apparatus comprising a rigid frame having freedom for angular rotation about a single input axis, a gyroscope having a rotor and a stator, and means for driving said rotor at constant speed mounted for a single degree of angular freedom about an output axis normal to said input axis, a servo loop for controlling the rotation of said frame about said input axis in response to the rotation of said stator about said output axis, a second gyroscope having a rotor, a stator, and means for driving said rotor mounted on said frame for angular freedom about an output axis normal to said input axis, servo means for applying equal and opposite torques to said stators about the output axes of said gyroscopes in the sense required to keep the stator of said second gyroscope angularly undisplaced with respect to said frame, and means for modulating the speed of said drive means of said second gyroscope to thereby stabilize said frame about said input axis.

22. In combination with gyro stabilized apparatus including a gyroscope, a frame, and servo means for stabilizing said frame in response to said gyroscope; a second gyroscope on said frame having a common input axis with said first gyroscope, means for periodically reversing the spin direction of said second gyroscope; and means for applying a compensating torque to the output axis of said first gyroscope in response to said second gyroscope.

23. Self-compensating gyroscopic apparatus comprising two gyroscopes, switching means for periodically reversing one gyroscope, means for measuring the drift rate of said one gyroscope relative to the other gyroscope at least once when said first gyro is running in one direction and at least once when said first gyro is running in the opposite direction, and means for applying output axis torques to the gyros until said drift rates are equal.

24. Self-compensating gyroscopic apparatus comprising two gyroscopes each having a rotor, a stator, and motive means for rotating said rotor; a frame mounting the stators of said gyroscopes with a single degree of angular freedom about output axes thereof, means for applying equal torque increments to the input axes of said gyroscopes in the sense required to equate the output axis drift rates thereof, and means for periodically reversing the direction of rotor rotation of one of said gyroscopes to thereby reduce to zero the rotation of said stators about a common input axis of said gyroscopes.

25. Self-compensating gyroscopic apparatus comprising two gyroscopes, a platform having angular freedom about a single input axis and mounting said gyroscope for angular freedom about output axes normal to said input axis, means for periodically reversing the spin direction of at least one gyroscope, and means fo applying to both gyroscopes output axis corrective torques dependent for value upon the variations in output axis drift rates of said gyroscopes due to reversal of spin direction thereof in the senses required to equalize said drift rates to thereby cause said platform to be stabilized about said input axis.

26. Gyroscopic apparatus comprising a frame, means for supporting said frame with angular freedom about three orthogonally disposed axes, three pairs of gyroscopes, each including a rotor, a stator, and means for rotating said rotor with respect to said stator mounted on said frame, each with a single degree of angular freedom with respect to said frame, each of said pairs of gyroscopes being oriented to drift in response to rotations of said frame about one of said three orthogonal axes, switch means for periodically reversing the rotor spin direction of each gyroscope in each pair, and servo means including pickoffs for detecting angular motion of said stators, torque means for applying torque to said frame, and torque means for applying torque to said stators about their axes of angular freedom for reducing the drift rate of said frame to zero.

27. Gyroscopic apparatus comprising a pair of gyroscopes each having a rotor, a stator, and an induction motor for rotating said rotors with respect to said stators, a frame having freedom for rotation about a single axis, bearing means for supporting the stators of said gyroscopes for angular freedom about output axes normal both to the axis of freedom of said frame and to the spin axes of the rotors of said gyroscopes, flexible lead-in wires situated on said output axes for conducting electricity to the stators of said motors with minimum disturbing torque, pickoff means associated with said stators for generating an electrical signal indicative of angular motion of said stators with respect to said frame, a torque motor for rotating said frame, and sequence switching means for periodically changing the direction of rotation of said rotors and for connecting the pickoff means of the gyroscope not being reversed to control said torque motor in the sense required to reduce the magnitude of said pickoff signal to thereby stabilize said frame by means of each gyroscope alternately, said gyroscopes reversing in direction to equate the drift of said frame in one direction with its drift in the other direction.

28. In combination a gyroscope having a rotor and a stator, apparatus supporting by said gyroscope, means for periodically reversing the spin direction of the rotor of said gyroscope independently of rotation of said gyroscope about its output axis to thereby compensate for drift errors of said gyroscope, and servo means responsive to the output of said gyroscope for stabilizing said apparatus when the rotor of said gyroscope is not being reversed.

29. In combination two gyroscopes each having a rotor and a stator, apparatus to be stabilized about a single axis by said gyroscopes, means independent of said gyroscopes for alternately and periodically reversing the spin direction of the rotors of said gyroscopes at equal intervals, and means for causing each gyroscope to stabilize said apparatus only at times when it is not being reversed.

30. In a gyroscopically stabilized device, gyroscopic apparatus comprising a gyroscope having a rotor, a platform supporting said gyroscope, pick-off means for detecting departure from alignment of said rotor and said platform, a servo system taking signals from said pick-off means and operatively associated with said platform for driving said platform in response to said detected departure, drive means for said rotor, and means for causing said drive means to reverse direction of spin at equal time intervals whereby a periodically reversed angular momentum vector is presented to any disturbing torque which may exist about an axis normal to the axis of spin of said rotor.

31. A gyroscope having input, output and spin axes, said gyroscope having a rotor, means for periodically reversing the spin direction of said rotor, and means for caging said gyroscope during reversal of said spin direction.

32. In a gyroscope having input, output and spin axes, a rotor and means for periodically reversing the spin direction thereof, means on said output axis for detecting motion of said rotor about said output axis, and means responsive to said detecting means for applying torque about said output axis in a sense to reduce said detected motion during reversal of said spin direction.

33. Gyroscopic apparatus comprising a gyroscope having a rotor and a stator, a stator bearing member defining an output axis transverse to the spin axis of said gyroscope, a second bearing member supporting said stator bearing member defining an input axis transverse to said output axis, drive means for said rotor capable of spinning said rotor either clockwise or counterclockwise, and means for periodically causing said drive means to reverse the direction of spin of said rotor whereby a periodically reversed angular momentum vector is presented to any disturbing torque which may exist about said output axis, said drive means comprising a three-phase alternating current motor and a source of three-phase alternating current, said reversing means comprising a cylindrical drum having a plurality of predeterminately interconnected and broken conducting peripheral strips insulatingly separated, a motor for rotating said drum at a uniform low speed, and contacting means for predeterminately connecting said source of alternating current to said three-phase motor whereby said three-phase motor is periodically caused to reverse the direction of spin of said rotor.

34. Gyroscopic apparatus comprising a gyroscope having a rotor and a stator, a stator bearing member defining an output axis transverse to the spin axis of said rotor, a second bearing member supporting said stator bearing member defining an input axis transverse to said output axis, reversible drive means for periodically causing the rotor of said gyroscope to reverse its direction of spin whereby a periodically reversed angular momentum vector is presented to disturbing torque about said output axis, a pickoff operative to detect precession of said gyroscope about said output axis, means for applying a torque to said input axis in response to a signal from said pickoff, and means for reversing the sense of the torque applied by said torque means in synchronism with changes in the direction of rotation of said gyroscope rotor whereby said input axis is maintained substantially independent of disturbing torques on said gyroscope.

35. Gyroscopic apparatus comprising a pair of gyroscopes each having a rotor, input, output and spin axes, said gyroscopes being mounted for relatively independent motion about said output axes, means for reversing the rotor spin direction of each gyroscope at a cyclical rate having a different phase for each gyroscope to maintain equal integrals of the product of rotor speed and time duration in each rotor direction for each gyroscope, means for deriving control signals from each gyroscope solely when it is not being reversed, and means for caging each gyroscope during reversal of its rotor direction.

36. In combination with a gyroscope having a rotor and input, output and spin axes, said gyroscope being subject to input axis drift due to output axis disturbing torque, means for reversing the sense of said drift comprising means independent of precession of said gyroscope for reversing the sense of spin direction of said rotor at times independent of precession of said gyroscope to effect reversal of the direction of the angular momentum vector of said rotor, and means for maintaining the spin axis of said rotor in substantially orthogonal relation to said input axis at least a portion of the time whereby input axis drift of each sense due to those disturbing torques which are independent of spin direction is diminished by the input axis drift of opposite sense.

37. In combination with a frame to be stabilized, a pair of gyroscopes, each having a rotor and an axis of precession, means mounting said gyroscopes to said frame for mutually independent angular freedom about the respective precession axes thereof, means for periodically reversing the spin direction of each of said rotors one at a time, and means for causing each said gyroscope to stabilize said frame only at times when its rotor is not being reversed.

38. The combination in a gyroscopic reference device of a frame, a gyroscope mounted on said frame having precession and spin axes, a pick-off for detecting relative movements of the frame and gyroscope, motive means for exerting a torque about the precession axis, motive means for spinning the rotor of the gyroscope, means for operating the spinning motive means to periodically reverse the direction of spin of the rotor of the gyroscope, and means responsive to said operating means during periods of reversal in the direction of spin of the rotor of the gyroscope for interconnecting said pick-off and torque exerting means.

39. The combination of a frame, a gyroscope mounted on said frame, a motor for spinning the rotor of said gyroscope, a pick-off having a part on the gyroscope and a part on the frame, means for operating said spinning motor to periodically reverse the direction of spin of the rotor of the gyroscope, and means responsive to said operating means for reversing the sense of the output of said pick-off with each reversal in the direction of spin of the rotor of the gyroscope.

40. A gyroscopic reference device having a frame, a plurality of gyroscopes mounted on said frame, motive means for spinning the rotor of each of said gyroscopes, and means for operating said spinning means to periodically reverse the direction of spin of the rotors of the gyroscopes two at a time.

References Cited in the file of this patent

UNITED STATES PATENTS

| | | |
|---|---|---|
| 1,192,468 | Shonnard | July 25, 1916 |
| 1,560,428 | Myers | Nov. 3, 1925 |
| 1,930,082 | Boykow | Oct. 10, 1933 |
| 1,947,562 | Marmonier | Feb. 20, 1934 |
| 2,414,291 | Evans | Jan. 14, 1947 |
| 2,524,553 | Wendt | Oct. 3, 1950 |
| 2,591,697 | Hays | Apr. 8, 1952 |

FOREIGN PATENTS

| | | |
|---|---|---|
| 11,040 | Great Britain | of 1907 |
| 599,249 | Great Britain | Mar. 9, 1948 |

OTHER REFERENCES

Technical notes National Advisory Committee for Aeronautics No. 662, pages 20 and 21.

UNITED STATES PATENT OFFICE

CERTIFICATE OF CORRECTION

Patent No. 2,999,391 September 12, 1961

Darwin L. Freebairn et al.

It is hereby certified that error appears in the above numbered patent requiring correction and that the said Letters Patent should read as corrected below.

Column 3, line 39, for "revresal" read -- reversal --; column 6, line 16, for "$\omega_x \div I_y$" read -- $\omega_y \div I_x$ --; line 72, for "angle" read -- single --; column 7, line 14, for "Winding" read -- Windings --.

Signed and sealed this 1st day of May 1962.

(SEAL)
Attest:

ERNEST W. SWIDER
Attesting Officer

DAVID L. LADD
Commissioner of Patents